United States Patent [19]

Pacek et al.

[11] Patent Number: 4,787,111
[45] Date of Patent: Nov. 29, 1988

[54] SELECTIVELY-RETRACTABLE ELEVATED WALKWAY EXTENSION

[75] Inventors: Mathew J. Pacek, St. Charles; Thomas E. Pomerville, Pinconning, both of Mich.

[73] Assignee: Magnum Construction Company, Inc., Midland, Mich.

[21] Appl. No.: 141,978

[22] Filed: Jan. 11, 1988

[51] Int. Cl.$^4$ .............................................. E01D 1/00
[52] U.S. Cl. .................... 14/71.1; 414/921; 182/113; 182/148; 49/116; 49/369
[58] Field of Search .................. 14/69.5, 71.1, 71.3, 14/71.5, 71.7; 414/495, 522, 537, 541, 921; 49/116, 366–369; 187/9 R; 182/113, 148

[56] References Cited

U.S. PATENT DOCUMENTS

| | | | |
|---|---|---|---|
| 4,106,150 | 9/1978 | Irwin | 14/71.3 |
| 4,171,550 | 10/1979 | Phaup | 14/71.1 |
| 4,222,140 | 9/1980 | Olewinski et al. | 14/71.3 |
| 4,280,243 | 7/1981 | Durrant | 14/71.1 |
| 4,403,362 | 9/1983 | Durrant | 14/71.1 |
| 4,482,284 | 11/1984 | Robbins et al. | 14/71.1 X |
| 4,572,328 | 2/1986 | Benko | 182/113 X |

FOREIGN PATENT DOCUMENTS 2749760 5/1979 Fed. Rep. of Germany ........ 49/116

Primary Examiner—Stephen J. Novosad
Assistant Examiner—John F. Letchford
Attorney, Agent, or Firm—Barnes, Kisselle, Raisch, Choate, Whittemore & Hulbert

[57] ABSTRACT

A selectively positionable extension for an elevated walkway includes a planar ramp mounted by rollers to a frame and coupled to the frame by a selectively extensible hydraulic ram. The frame itself is supported by a second ramp for controlled vertical positioning. A pair of handrail gates are pivotally mounted on the ramp frame at opposed lateral sides thereof, and engage guide channels in the ramp side edges for automatically opening and closing the handrail gates as the ramp is extended from and retracted into the frame. The guide channels are so constructed that the handrail gates open and close from overlapping positions without interference. The entire extension is provided as a modular assembly which may be readily incorporated into existing or new walkway constructions.

14 Claims, 6 Drawing Sheets

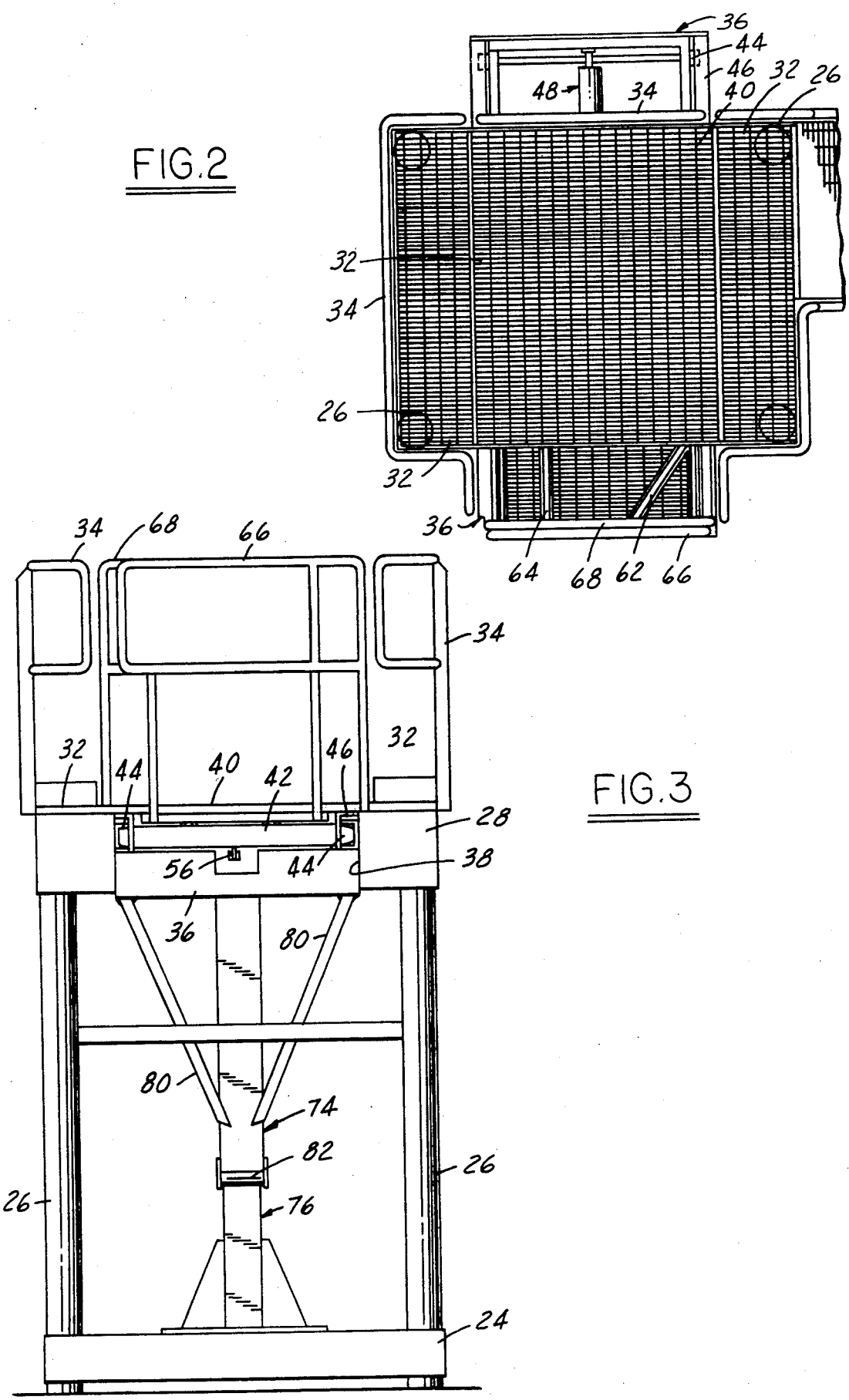

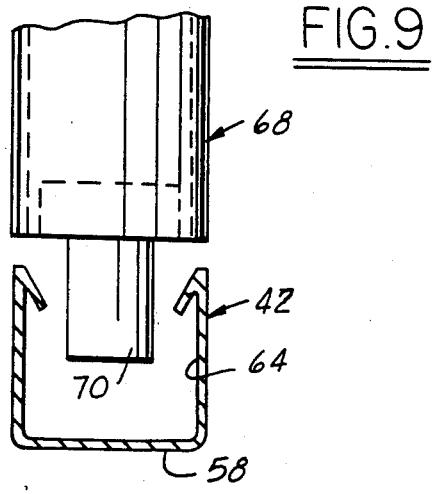
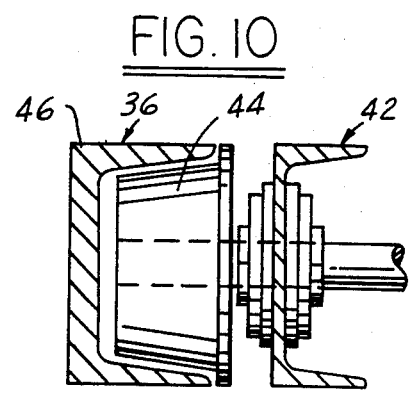
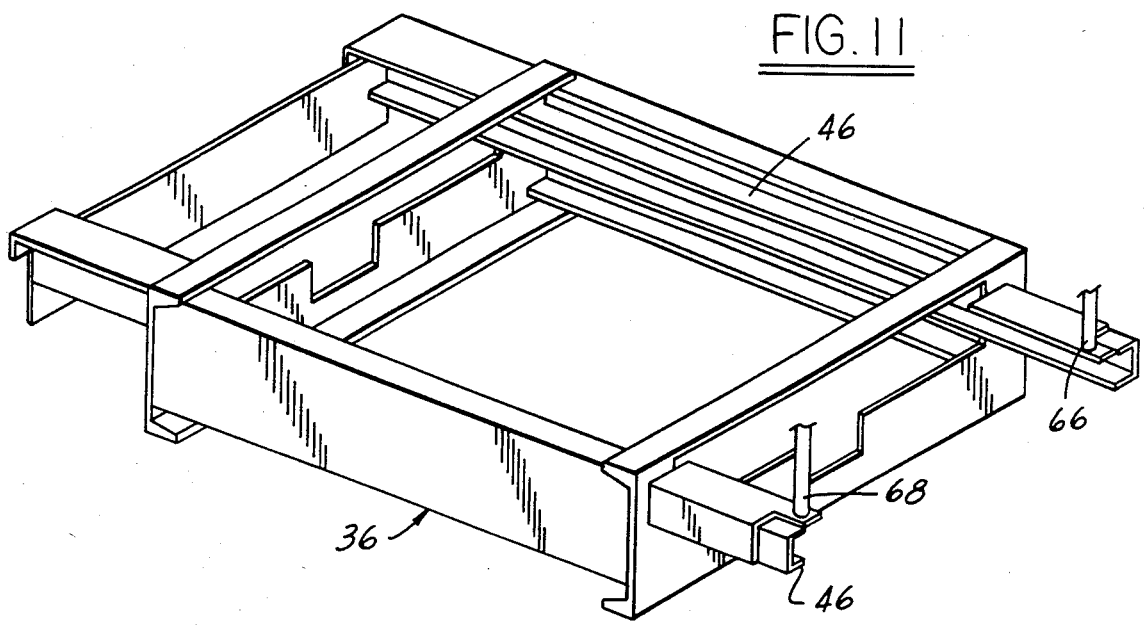

SELECTIVELY-RETRACTABLE ELEVATED WALKWAY EXTENSION

The present invention is directed to elevated walkways which form platforms for access to railroad tank cars, tanker trucks and the like, and more particularly to a ramp which is selectively laterally extensible from such walkway for bridging the space between the walkway and an adjacent structure.

Elevated walkways of the described character are conventional in loading platforms or docks for freight trains and the like. Such walkways typically extend longitudinally parallel to the train tracks and have handrail openings at predetermined positions corresponding to distance between doors in adjacent tank cars. When a train is positioned adjacent to the track, pieces of lumber or the like are manually positioned to bridge the gap between the walkway and tank car for connecting hoses and the like so that the car can be unloaded.

To overcome the manifest deficiencies of the practice described above, applicants have heretofore marketed a walkway extension which comprises a planar ramp and a frame mounting the ramp beneath the walkway for movement in a direction lateral to the longitudinal direction of the walkway. A pair of handrails are pivotally mounted on the ramp-mounting frame at longitudinally spaced positions adjacent to opposite side edges of the ramp. Guide channels on the ramp are coupled to the handrails for pivoting the handrails to an open position as the ramp extends from the mounting frame and to a closed position as the ramp is retracted into the mounting frame. An hydraulic ram couples the ramp to the mounting frame, and is responsive to an operator control system for selectively extending the ramp to an adjacent structure such as a train car and automatically pivotally opening the handrails as the ramp is extended, and retracting the ramp into the mounting frame while automatically pivoting the handrails to a closed position to prevent an operator from inadvertently falling into the space between the walkway and train car.

Although the walkway extension so described has enjoyed substantial commercial acceptance and success, further improvements remain desirable. For example, it is desirable to extend the lengths of the pivoted handrails so as to substantially enclose the ramp in the extended position of the latter while preventing interference between the handrails as the ramp is extended and retracted. It is further desirable to provide the walkway extension as a modular assembly for ready implementation in existing walkway structures as well as new walkway constructions. It is also desirable to provide for adjustable vertical positioning of the extension so as to accommodate vertical mismatch between the plane of the elevated walkway and the door of the adjacent railway car or the like. It is an object of the present invention to provide an improved walkway extension of the described character which satisfies some or all of the aforementioned desiderata.

The invention, together with additional objects, features and advantages thereof, will be best understood from the following description, the appended claims and the accompanying drawings in which:

FIG. 2 is a top plan view of the walkway platform and extension of FIG. 1;

FIG. 3 is a front elevational view of the walkway platform and extension of FIGS. 1 and 2;

Figure 5:
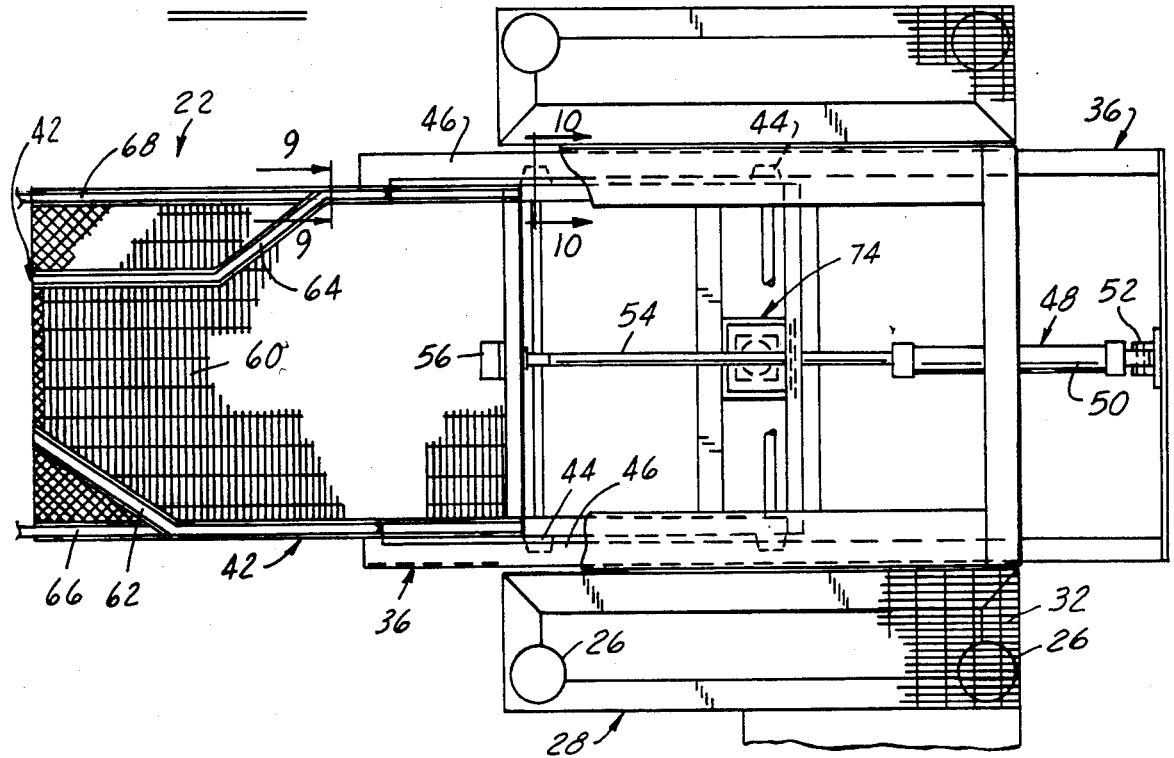
Figure 6:
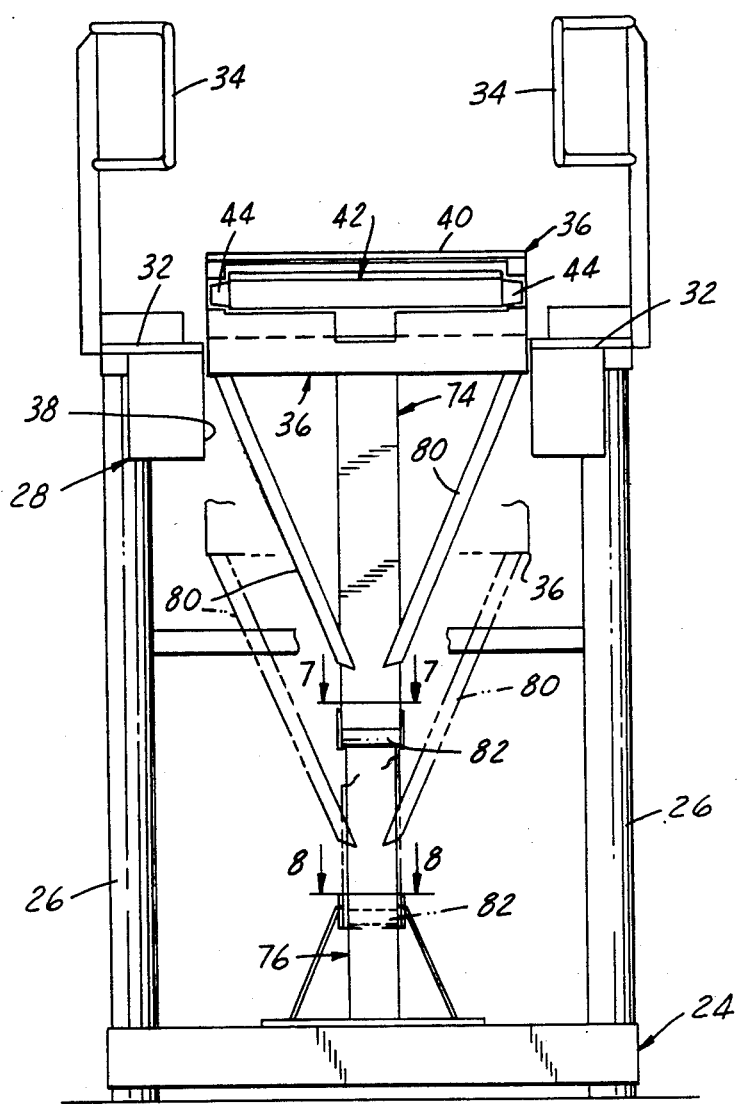
FIG. 6 is a fragmentary front elevational view showing selective vertical positioning of the extension in accordance with one feature of the invention.
Figure 7:
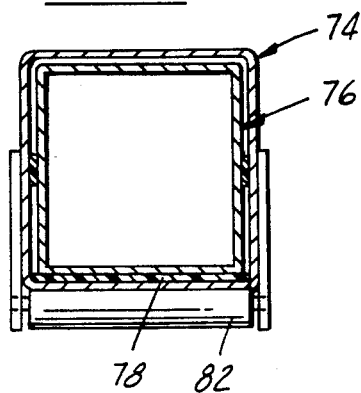
Figure 8:
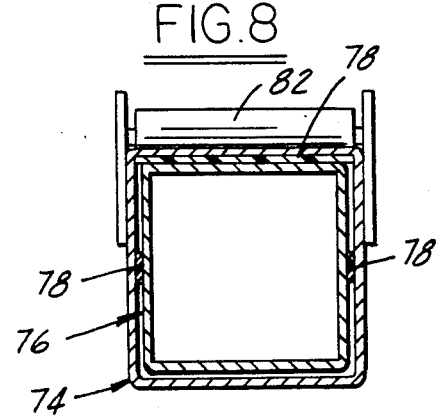
Figure 12:
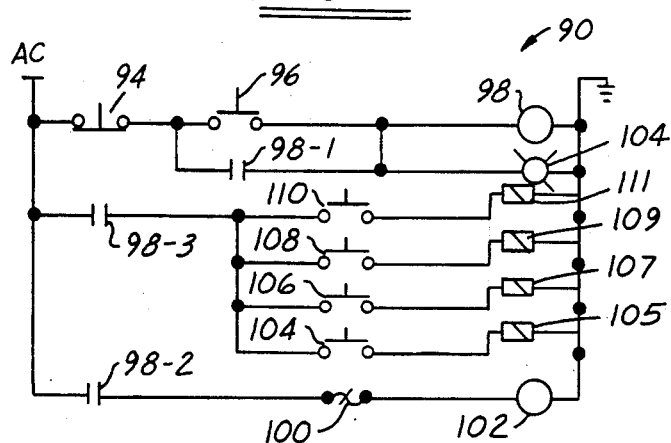
Figure 13:
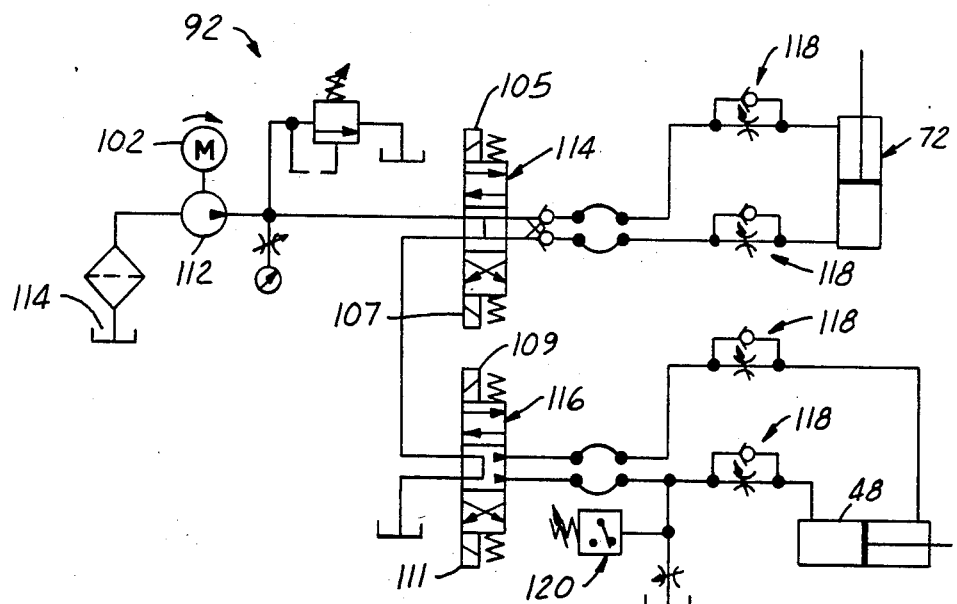
Figure 14:
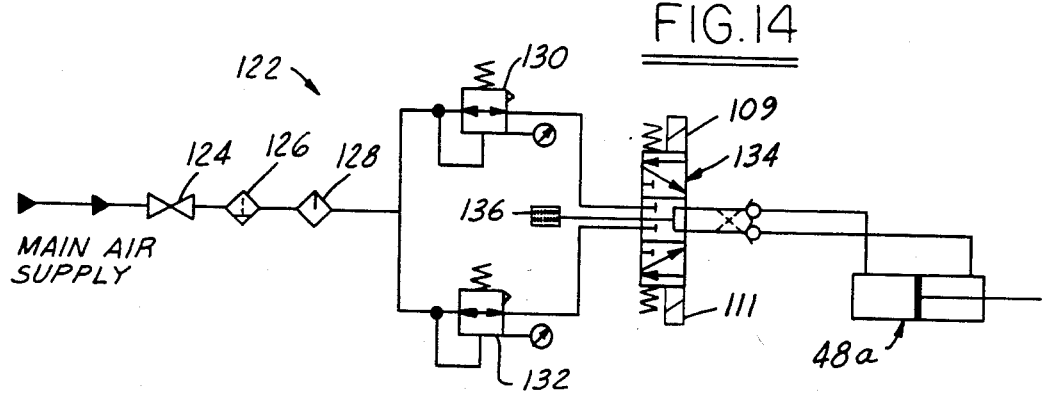

FIGS. 7 and 8 are sectional views taken substantially along the lines 7—7 and 8—8 in FIG. 6;

FIGS. 9 and 10 are sectional views taken substantially along the lines 9—9 and 10—10 in FIG. 5;

FIG. 11 is a perspective view of the ramp-mounting frame;

FIG. 12 is an electrical schematic diagram of operator control circuitry in accordance with a preferred embodiment of the invention;

FIG. 13 is a schematic diagram of platform-control hydraulics in accordance with a preferred embodiment of the invention; and FIG. 14 is a schematic diagram of a pneumatic system for driving the walkway extension in accordance with a modification to the preferred embodiment of the invention.

Figure 1:
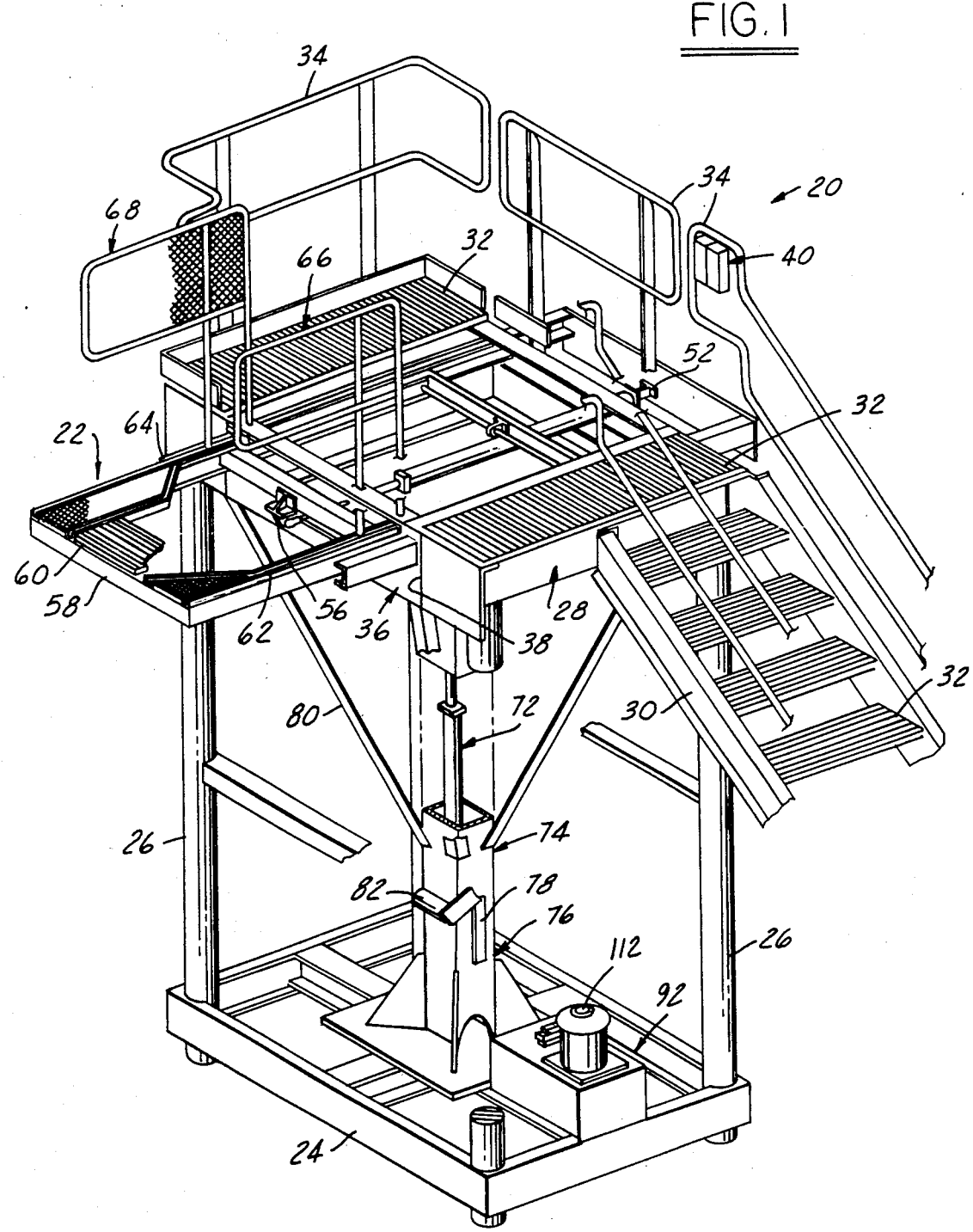
FIG. 1 is a fragmentary perspective view of a walkway platform which includes a walkway extension in accordance with a presently preferred embodiment of the invention.

FIG. 1 illustrates a walkway platform 20 which includes a walkway platform extension 22 in accordance with a presently preferred embodiment of the invention. Platform 20 comprises a support base 24 having four legs 26 supporting respective corners of a platform frame 28. A staircase 30 extends to and from platform frame 28. Suitable grating 32 is carried as the horizontal surfaces of platform frame 28 and staircase 30. Staircase 30 and platform 28 are enclosed by suitably formed handrails 34. It will be appreciated as the description unfolds that the principles of the invention are in no way limited to one-station platforms 20 per se. To the contrary, the extension of the present invention may be employed in walkways of any length or number of loading stations. The specific platform 20 and staircase 30 of the drawings are for illustrative purposes only.

Walkway extension 22 includes a rectangular extension frame 36 positioned within a corresponding opening 38 in platfrom frame 28, with the top surface of extension frame 36 being covered by a grating 40 (FIGS. 2 and 3) parallel to and normally flush with gratings 32 on platform frame 28. A planar ramp 42 of generally rectangular construction is mounted by the rollers 44 within opposed channels 46 on frame 36 beneath grating 40 for motion in a plane parallel with and beneath grating 40 laterally outwardly with respect to platform frame 28. An hydraulic ram 48 includes a cylinder 50 pivotally coupled at 52 to frame 36 and an actuator rod 54 coupled to a bracket 56 which depends from ramp 42. Ram 48 thus moves ramp 42 inwardly and outwardly of frame 36, with ramp 42 being guided with respect to frame 36 by the ramp rollers 44 within frame guide channels 46.

Ramp 42 has a frame 58 covered by a grating 60. A pair of channels 62,64 extend along the parallel side edges of ramp 42. A pair of handrail gates 66,68 each have an outside leg pivotally mounted to frame 36 at laterally spaced sides thereof above a corresponding channel 62,64, and an inside leg from which a pin 70 (FIG. 9) projects into an adjacent one of the guide channels 62,64. Channels 62,64 include portions which run parallel to and along the respective side edge of ramp 42 and portions which are angulated laterally inwardly with respect to each other. It will be noted that the angulated portions of channels 62,64 are offset from each other with respect to the direction of motion of ramp 42. That is, channel 62 runs along one side edge of ramp 42 and then angles in at the forward ramp edge, as in applicant's prior art extension described above. However, channel 64 angles inward at a position spaced from the ramp forward edge, and then again runs parallel to the side edge to the forward edge. The forward end of each channel 62,64 is spaced from the corresponding ramp side edge by a distance which corresponds to spacing between the gate legs.

Figure 4:
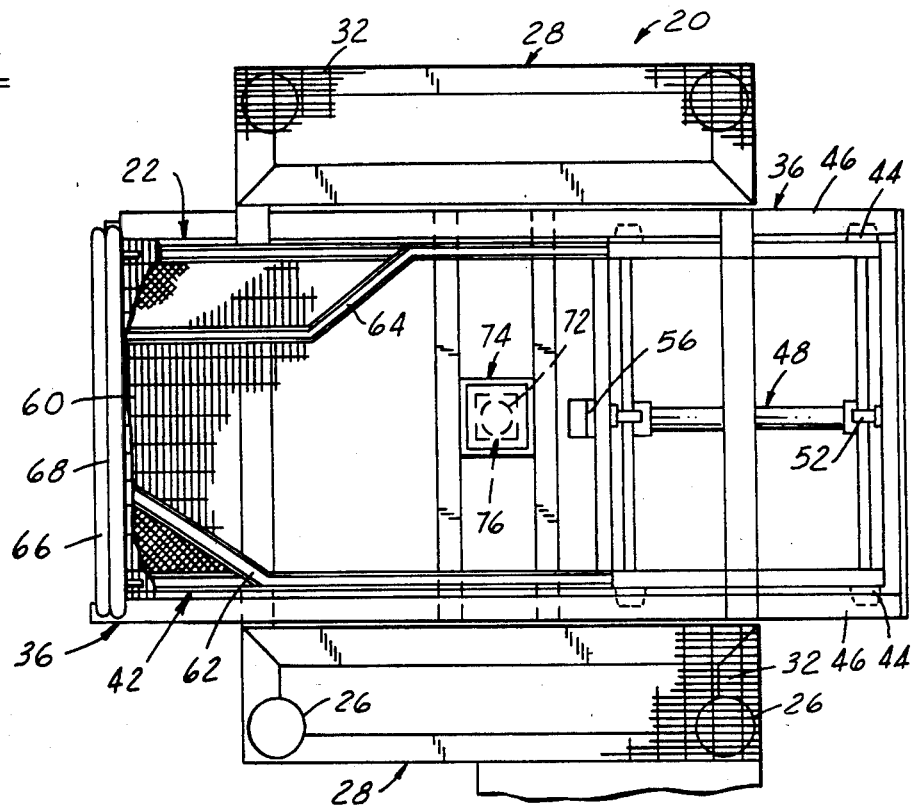
FIGS. 4 and 5 are fragmentary plan views of the platform and extension of FIGS. 1-3 in the fully retracted (FIG. 4) and fully extended (FIG. 5) positions.

Handrail gates 66,68 are of sufficient length to overlie the side edges of ramp 42 in the open position thereof, as best seen in FIG. 5, and to overlap each other in the closed position, as best seen in FIG. 4. As ramp 42 is driven from the closed position (FIG. 4) toward the open position (FIG. 5), the guide pin 70 on gate 66 moves through the angulated portion of guide channel 62 which cams gate 66 forwardly with respect to frame 36. In the meantime, guide pin 70 on gate 68 moves through that portion of channel 64 which is parallel to but spaced from the ramp side edge, such that gate 68 remains closed. After gate 66 is fully open, gate 68 engages the angulated portion of corresponding guide rail 64, whereby gate 68 is opened as ramp 42 is further extended. The process is reversed—i.e., gate 68 fully closes before gate 66 begins to close—as ramp 42 is retracted. Thus, the offset angulated portions of guide channels 62,64 prevent interference of handrail gates 66,68 with each other as ramp 42 is extended and retracted. Handrail gates 66,68 may be lifted from channels 62,64 and manually placed in the open position in instances where the railway car or the like is sufficiently close to platform 20 as to limit extension of ramp 42.

Frame 36 is mounted on base 24 by an hydraulic ram 72 positioned within a pair of telescopically slidable tubular guide sections 74,76. Section 76 is mounted to and extends upwardly from base 24. Section 74 is affixed to and extends centrally downwardly from frame 36, and is slidable over the low-friction strips 78 on the outer surfaces of guide section 76. Struts 80 extend upwardly and outwardly from the lower portion of guide 74 to the four adjacent corners of frame 36. A pair of guide rollers 82 are fixed to the lower edge of guide section 74 and engage the opposing surfaces of guide section 76. Thus, the entire extension assembly is vertically positionable with respect to platform frame 28 through control of ram 72. Frame 36 and ramp 42 are maintained in horizontal orientation by guide sections 74,76 and struts 80. It will further be appreciated that the entire extension mechanism, including frame 36, ramp 42 and gates 66,68 mounted thereto, and vertical guide tubes 74,76 and support braces 80 depending therefrom, are provided as a modular assembly which may be readily added to an existing walkway through retrofit of the latter, and which may be readily incorporated into a new walkway assembly.

A control electronics assembly 90 (FIGS. 1 and 12) is suitably mounted for easy access on platform 20 and cooperates with control hydraulics 92 (FIGS. 1 and 13) for controlling motion of ramp 42 inwardly and outwardly, and of the entire extension assembly upwardly and downwardly. Control electronics 90 includes an operator stop switch 94 and a start switch 96 connected in series with a motor control relay 98 across a.c. power. A pair of normally open contacts 98-1 associated with relay 98 are connected across start switch 96. A second pair of normally open contacts 98-2 are connected through a thermal overload 100 to an hydraulic pump motor 102. An operator lamp 104 advises when motor control relay 98 is energized. A ramp UP pushbutton 104, a DOWN pushbutton 106, an IN pushbutton 108 and an OUT pushbutton 110 are individually connected in series with a third set of normally open contacts 98-3, and with solenoid coils 105, 107, 109 and 111 of associated control valves 114, 116 (FIG. 13).

The control hydraulics 92 are illustrated in FIG. 13 as including a pump 112 (FIGS. 1 and 13) coupled to motor 102 (FIGS. 12 and 13) for supplying hydraulic fluid under pressure from a source 114. An up/down control valve 114 is responsive to solenoid coils 105,107 for selectively feeding hydraulic fluid from pump 112 to ram 72. Likewise, an in/out control valve 116 is responsive to solenoid coils 109,111 for selectively feeding hydraulic fluid under pressure from pump 112 to in/out ram 48. Hydraulic system 92 also includes flow controls 118 and a suitably-positioned pressure relief switch 120. Thus, pump 112 is energized by depression of start switch 96, and remains energized until depression of stop switch 94. While the pump is energized, vertical and horizontal position of the ramp can be controlled by suitable activation of switches 104–110, with corresponding control of valves 114,116 and actuation of rams 48,72.

FIG. 14 illustrates a pneumatic system 122 for control of in/out motion of ramp 42. An air supply is connected through a lockout 124, a filter 126 and a lubricator 128 to a pair of regulators 130,132. An electropneumatic valve 134 has solenoid coils 109,111 (FIGS. 12 and 14) and associated ports for controlling supply of air under pressure to an electropneumatic ram 48a in place of hydraulic ram 48 in the embodiment hereinabove described. Valve 34 also exhausts air from ram 48a through a muffler 136.

The invention claimed is:

1. In an elevated walkway assembly, a planar walkway and means for selectively extending said walkway comprising a planar ramp, means mounting said ramp for movement between a retracted position beneath said walkway and an extended position a pair of handrail gates pivotally mounted on said ramp-mounting means at spaced positions adjacent to opposite side edges of said ramp, guide means on said ramp coupled to said handrail gates for pivoting said handrail gates to an open position as said ramp extends from said ramp-mounting means and to a closed position as said ramp is retracted into said ramp-mounting means, and means for selectively extending said ramp from said mounting means and retracting said ramp into said mounting means;

characterized in the said handrail gates overlap each other in said closed position, and in that said guide means on said ramp comprises assymetric guide means for pivoting one said handrail gate to said closed position prior to the other of said handrail gates to prevent interference of said handrail gates with each other.

2. The walkway assembly set forth in claim 1 wherein said guide means comprise a pair of guide channels on said ramp extending along opposed side edges of said ramp and angulated toward each other remotely of said ramp-mounting means, each said handrail gate having means guidingly received in a corresponding said channel.

3. The walkway assembly set forth in claim 2 wherein angulated portions of said channels are offset from each other lengthwise of said ramp.

4. The walkway assembly set forth in claim 2 wherein the entire said means for selectively extending said walkway is of single-assembly modular construction.

5. The walkway assembly set forth in claim 2 wherein said means for selectively extending said walkway further comprises support means mounting said ramp-mounting means for vertical motion with respect to said planar walkway.

6. The walkway assembly set forth in claim 5 wherein said support means comprises a base, first and second tubular guide sections one slidably telescopically received over the other, a first of said guide sections extending upwardly from said base and a second of said guide sections extending downwardly from said ramp-mounting means, and means for selectively vertically moving said second guide means and said ramp-mounting means with respect to said first guide means and said base.

7. The walkway assembly set forth in claim 6 wherein said selectively-moving means comprises an hydraulic cylinder mounted within said guide means.

8. The walkway assembly set forth in claim 7 wherein said ramp and said ramp-mounting means are of rectangular construction, said guide means being centrally positioned beneath said ramp-mounting means and including angulated struts extending upwardly and outwardly from a lower end of said second guide means to adjacent corners of said rampmounting means.

9. The walkway assembly set forth in claim 6 wherein the entire said means for selectively extending said walkway, including said base, is of single-assembly modular construction.

10. In an elevated walkway assembly, a planar walkway and means for selectively extending said walkway comprising a planar ramp, means mounting said ramp for movement between a retracted position beneath said walkway and an extended position, a pair of handrail gates pivotally mounted on said ramp-mounting means at spaced positions adjacent to opposite side edges of said ramp, guide means on said ramp coupled to said handrail gates for pivoting said handrail gates to an open position as said ramp extends from said ramp-mounting means and to a closed position as said ramp is retracted into said ramp-mounting means, means for selectively extending said ramp from said mounting means and retracting said ramp into said mounting means, and support means mounting said ramp-mounting means for vertical motion with respect to said planar walkway.

11. The walkway assembly set forth in claim 10 wherein said support means comprises a base, first and second tubular guide sections one slidably telescopically received over the other, a first of said guide sections extending upwardly from said base and a second of said guide sections extending downwardly from said ramp-mounting means, and means for selectively vertically moving said second guide means and said ramp-mounting means with respect to said first guide means and said base.

12. The walkway assembly set forth in claim 11 wherein said selectively-moving means comprises an hydraulic cylinder mounted within said guide means.

13. The walkway assembly set forth in claim 12 wherein said ramp and said ramp-mounting means are of rectangular construction, said guide means being centrally positioned beneath said ramp-mounting means and including angulated struts extending upwardly and outwardly from a lower end of said second guide means to adjacent corners of said ramp-mounting means.

14. The walkway set forth in claim 13 wherein the entire said means for selectively extending said walkway, including said base, is of single-assembly modular construction.

* * * * *